(12) United States Patent
Fukui

(10) Patent No.: US 12,109,792 B2
(45) Date of Patent: Oct. 8, 2024

(54) VEHICLE INTERIOR MATERIAL

(71) Applicant: KOTOBUKIYA FRONTE CO., LTD., Tokyo (JP)

(72) Inventor: Kazuki Fukui, Saitama (JP)

(73) Assignee: KOTOBUKIYA FRONTE CO., LTD. (JP)

( * ) Notice: Subject to any disclaimer, the term of this patent is extended or adjusted under 35 U.S.C. 154(b) by 0 days.

(21) Appl. No.: 17/270,510

(22) PCT Filed: Jan. 25, 2019

(86) PCT No.: PCT/JP2019/002537
§ 371 (c)(1),
(2) Date: Feb. 23, 2021

(87) PCT Pub. No.: WO2020/152864
PCT Pub. Date: Jul. 30, 2020

(65) Prior Publication Data
US 2021/0394482 A1    Dec. 23, 2021

(51) Int. Cl.
*B32B 3/12* (2006.01)
*B32B 3/26* (2006.01)
(Continued)

(52) U.S. Cl.
CPC ............... *B32B 3/12* (2013.01); *B32B 3/266* (2013.01); *B32B 5/02* (2013.01); *B32B 7/022* (2019.01);
(Continued)

(58) Field of Classification Search
None
See application file for complete search history.

(56) References Cited

U.S. PATENT DOCUMENTS 6,045,898 A * 4/2000 Kishi ..................... C08L 63/00
                                                              525/107
6,720,069 B1   4/2004 Murakami et al.
(Continued)

FOREIGN PATENT DOCUMENTS

CN       204109475 U    1/2015
EP         3904722 A1   11/2021
(Continued)

OTHER PUBLICATIONS

Nakajima et al., mchine translation of JP 2017-151256, Aug. 31, 2017 (Year: 2017).*
(Continued)

*Primary Examiner* — Mary I Omori
(74) *Attorney, Agent, or Firm* — Lerner David LLP

(57) ABSTRACT

The vehicle interior material of the present invention has a multilayer structure, the material including: a hard core layer having a hollow portion inside; a design layer provided on one surface side of the core layer; a first film layer provided between the core layer and the design layer; and a second film layer provided on a surface of the core layer on a side opposite to the first film layer, wherein a strain εa is smaller than a strain εb, the strain εa being a strain on a surface of a structure on a side of the first film layer, the structure having the first film layer, the core layer, and the second film layer, and the strain εb being a strain on a surface of the structure on a side of the second film layer.

7 Claims, 4 Drawing Sheets

(51) Int. Cl.
  *B32B 5/02* (2006.01)
  *B32B 7/022* (2019.01)
  *B32B 27/08* (2006.01)
  *B32B 27/12* (2006.01)
  *B32B 27/32* (2006.01)
  *B60R 13/02* (2006.01)

(52) U.S. Cl.
  CPC .............. *B32B 27/08* (2013.01); *B32B 27/12* (2013.01); *B32B 27/32* (2013.01); *B60R 13/02* (2013.01); *B32B 2307/54* (2013.01); *B32B 2605/003* (2013.01)

(56) References Cited

U.S. PATENT DOCUMENTS

| | | | | |
|---|---|---|---|---|
| 2003/0134085 | A1* | 7/2003 | Haas | B32B 29/02 428/116 |
| 2014/0302276 | A1* | 10/2014 | Kusu | B32B 5/026 428/116 |
| 2017/0253005 | A1 | 9/2017 | Matsumoto | |
| 2020/0101690 | A1 | 4/2020 | Oishi et al. | |
| 2021/0053511 | A1* | 2/2021 | Masumura | B32B 5/08 |
| 2021/0183350 | A1* | 6/2021 | Fukui | B60R 13/0815 |

FOREIGN PATENT DOCUMENTS

| | | | | |
|---|---|---|---|---|
| JP | S58101042 | A | | 6/1983 |
| JP | S5991049 | A | | 5/1984 |
| JP | 2001184076 | A | | 7/2001 |
| JP | 2006315443 | A | | 11/2006 |
| JP | 2008520456 | A | | 6/2008 |
| JP | 2009093064 | A | | 4/2009 |
| JP | 2010274527 | A | | 12/2010 |
| JP | 2011113057 | A | | 6/2011 |
| JP | 2011180381 | A | | 9/2011 |
| JP | 2011189747 | A * | 9/2011 | ............ B29C 70/08 |
| JP | 2011251673 | A | | 12/2011 |
| JP | 2013233796 | A | | 11/2013 |
| JP | 2013237242 | A | | 11/2013 |
| JP | 2015074358 | A | | 4/2015 |
| JP | 2015187632 | A | | 10/2015 |
| JP | 2016007900 | A | | 1/2016 |
| JP | 2017065026 | A | | 4/2017 |
| JP | 2017151256 | A * | 8/2017 | |
| WO | 2006053407 | A1 | | 5/2006 |
| WO | 2016031479 | A1 | | 3/2016 |
| WO | 2018225706 | A1 | | 12/2018 |
| WO | WO-2019186970 | A1 * | 10/2019 | ............ B32B 3/266 |
| WO | WO-2020084802 | A1 * | 4/2020 | ......... B60R 13/0815 |

OTHER PUBLICATIONS

Honma et al., machine translation of JP 2011-189747, Sep. 29, 2011 (Year: 2011).*
Search Report for Application No. 19912175.7 dated Dec. 20, 2021. 2 pgs.
International Search Report for Application No. PCT/JP2019/002537, mailed Apr. 2, 2019, pp. 1-2.
Alfakem, Web Page of Technical ThermHex Presentation. <<http://www.alfakem.com/wp-content/uploads/2017/04/ThermHex_Technical_Presentation_ forDistributors.pdf>> [retrieved on Jun. 8, 2023].32 pgs.
Alfakem, Web Page of "Technical ThermHex Presentation"—additional information—<<http://www.alfakem .com/en/downloads/>> [retrieved on Jun. 5, 2023].5 pgs.
ThermHex, ThermHex Data Sheet THPP80FN , <<https://thermhex..com/thermhex-data-sheet-thpp80fn-eng2013/>>, <<https://thermhex..com/m/wp-content/uploads/2017/03/technicalthermhex-data-sheet-thpp80fn-eng2013.gif>> [retrieved on Jun. 4, 2023]. 3 pgs.
ThermHex, Product properties &Nomenclature, <<https://thermhex..com/?s=THPP80&lang=en>>, <<https://thermhex..com/product-properties-nomenclature/>> [retrieved on Jun. 5, 2023]. 4 pgs.

* cited by examiner

VEHICLE INTERIOR MATERIAL

CROSS-REFERENCE TO RELATED APPLICATIONS

The present application is a national phase entry under 35 U.S.C. § 371 of International Application No. PCT/JP2019/002537 filed Jan. 25, 2019, published in Japanese, incorporated herein by reference.

TECHNICAL FIELD

The present invention relates to a vehicle interior material.

BACKGROUND ART

A typical structure of a vehicle has an engine compartment provided at the front, a trunk compartment provided at the rear, and a passenger compartment provided in the middle thereof. The passenger compartment is provided with seats such as a driver seat, a front passenger seat, and a rear seat. In addition, the passenger compartment has a dash insulator, a floor carpet, a floor spacer, a trunk trim, and a trunk floor installed so that they cover the outside of the vehicle interior. These components are formed in uneven shapes according to shapes of vehicle bodies or designs of components. Furthermore, the exterior under a vehicle body has a front fender liner, a rear fender liner, and an undercover that is formed in an uneven shape for controlling the air flow, installed thereon. For many of these components, a thermoplastic resin is used as a material, and each of the materials is heated and press-molded by a die having the shape of the component to be finished into an uneven-shaped component having a plurality of portions with different thicknesses.

For these vehicle components, high rigidity and weight reduction are required at the same time to reduce fuel consumption. Furthermore, among these vehicle components, interior materials can be seen by vehicle users, so designability thereof is important. Accordingly, as a design layer, a layer configured with fiber such as nonwoven fabric, plain needle punched fabric, or velour is adhered to the surface of the component. In addition, as a recent trend of vehicle development, the quietness in the interior of a vehicle is emphasized. Noise transmitted to the interior of a vehicle includes noise from the windows, noise from the tires, noise from under the vehicle body, noise from engine sounds, and noise from motor sounds. Therefore, the vehicle components are also required to have acoustic performance against noise generated in vehicles.

In order to achieve both high rigidity and weight reduction at the same time, a hollow core material in which tubular cells such as a honeycomb core are arranged in a plurality of rows is often used. For example, Patent Document 1 describes a laminated structure in which a fiber sheet and a thermoplastic resin film are sequentially adhered to at least one main surface of a hollow plate-shaped body made of a thermoplastic resin. Patent Document 1 also describes that this laminated structure can reduce its own weight, and even when it is bent, it hardly has protruded wrinkles or recesses generated due to buckling at the bent portion.

REFERENCE DOCUMENT LIST

Patent Document

Patent Document 1: JP 2013-233796 A

SUMMARY OF THE INVENTION

Problem to be Solved by the Invention

Vehicle interior materials are required to have high rigidity and a low weight, and are disposed in locations visible to vehicle users. Therefore, designability is also important. Therefore, as a design layer, a layer configured with fiber, such as nonwoven fabric, plain needle punched fabric, or velour, is generally adhered to the surface of a vehicle interior material. However, if a design layer is simply adhered to a core material in which tubular cells are arranged in a plurality of rows to achieve high rigidity and weight reduction, a problem is that wrinkles are generated on the design layer after heat-molding into a predetermined uneven shape.

Therefore, an object of the present invention is to provide a vehicle interior material capable of preventing wrinkles from being generated on a design surface even if the material is heat-molded into a predetermined uneven shape while maintaining a low weight and high rigidity.

Means for Solving the Problem

To achieve the object, the present invention provides a vehicle interior material having a multilayer structure, the material including: a hard core layer having a hollow portion inside; a design layer provided on one surface side of the core layer; a first film layer provided between the core layer and the design layer; and a second film layer provided on a surface of the core layer on a side opposite to the first film layer, wherein a strain $\varepsilon a$ is smaller than a strain $\varepsilon b$, the strain $\varepsilon a$ being a strain on a surface of a structure on a side of the first film layer, the structure having the first film layer, the core layer, and the second film layer, the strain $\varepsilon b$ being a strain on a surface of the structure on a side of the second film layer.

The hard core layer may have a Young's modulus of 100 kPa or more in the compression direction. The core layer may have a structure in which tubular cells are arranged in a plurality of rows. The tubular cell may have a polygonal tubular shape such as a substantially quadrangular tubular shape or a substantially hexagonal tubular shape, or may have a curved tubular shape such as a substantially circular tubular shape or a substantially elliptical tubular shape. It is preferable that: each of the cells in the core layer have a closed surface at one end and an open end at another end; the open ends of the cells each allow an internal space of the cell to be in communication with an outside; and the open ends of the cells be arranged on both sides of the core layer such that rows of the open ends of the cells are in every other row. The open end, the one-side closed surface, and the other-side closed surface may have a polygonal shape such as a substantially quadrangular shape or a substantially hexagonal shape, or may have a curved shape such as a substantially circular shape or a substantially elliptical shape, according to the shape of the cell.

The relationship among the strain $\varepsilon a$, the strain $\varepsilon b$, and a thickness h of the structure preferably satisfies the expression $0 < \varepsilon a \times h / (\varepsilon a + \varepsilon b) < 5$, the strain $\varepsilon a$ being a strain on a surface of the structure on the side of the first film layer, and the strain $\varepsilon b$ being a strain on a surface of the structure on the side of the second film layer. The first film layer or the second film layer may have a plurality of apertures penetrating the layer. The thickness h of the structure is preferably less than 20 mm.

Effects of the Invention

When a multilayered structure including a hard core layer having a hollow portion inside is bent, the surface thereof contracts due to the bending. On the surface that contracts, when the amount of bending is great, the material that cannot sufficiently contract escapes to the outside of the multilayered structure. This causes wrinkles. The vehicle interior material according to the present invention has the structure having the first film layer, the core layer, and the second film layer. This structure has the strain εa smaller than the strain εb, where the strain εa is the strain on the surface of the structure on the first film layer side, which is on the design layer side, and the strain εb is the strain on the surface of the structure on the second film layer side. This configuration, when the vehicle interior material is bent, causes the deformation amount of contraction on the surface on the first film layer side, which is on the design layer side, to be smaller than the deformation amount of elongation on the surface on the second film layer side, which is on the side opposite to the design layer. As a result, the vehicle interior material can reduce generation of wrinkles on a design layer 50. Therefore, the vehicle interior material can prevent wrinkles from being generated on the design surface even if the design surface is heat-molded into a predetermined uneven shape, while maintaining a low weight and high rigidity.

In addition, the configuration, such that the core layer is a core layer in which tubular cells are arranged in a plurality of rows, can exhibit higher rigidity while maintaining a low weight. In particular, the configuration such that: each of cells in the core layer has a closed surface at one end and an open end at the other end; open ends of the cells each allow an internal space of the cell to be in communication with an outside; and open ends of the cells is arranged on both sides of the core layer such that rows of the open ends of the cells are in every other row, can further reduce its own weight and improve adhesiveness with the first and second film layers while maintaining high rigidity.

MODE FOR CARRYING OUT THE INVENTION

An embodiment of a vehicle interior material according to the present invention is described below with reference to the accompanying drawings. Note that the drawings are not intended to be drawn to scale unless otherwise specified.

Figure 1:
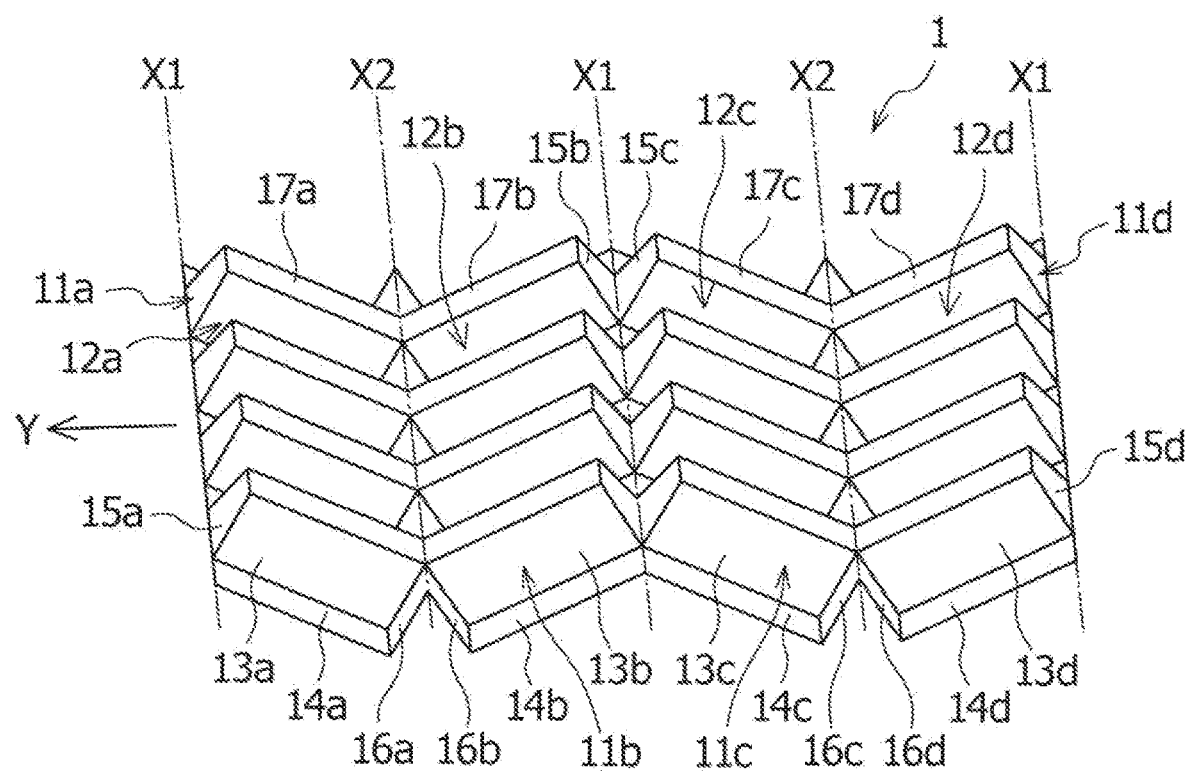
FIG. 1 is a perspective view showing a manufacturing process of a core material used for a core layer in a vehicle interior material according to the present invention.

First, a core layer common to each embodiment of the vehicle interior material according to the present invention is described below. FIG. 1 is a perspective view showing a manufacturing process of a core material to be this core layer. Note that the manufacturing method of this core material is described in detail in WO 2006/053407, which is incorporated herein by reference.

As shown in FIG. 1, a flat material sheet is thermoformed by a roller (not shown) having a predetermined die to be plastically deformed substantially without cutting of the sheet, so that a core material 1 in the figure is formed. The material of the core material 1 to be used can include, for example, a thermoplastic resin such as polypropylene (PP), polyethylene (PE), polyethylene terephthalate (PET), a composite material with fibers, paper, and metal, but it is not limited to these. In particular, a thermoplastic resin is preferable. In this embodiment, a case in which a thermoplastic resin is used is described below. The thickness of the material sheet is preferably in the range of 0.05 mm to 0.50 mm, for example, but it is not limited to this, and the thickness of the core material 1 after thermoforming is substantially the same.

The core material 1 has a three-dimensional structure in which ridge portions 11 and valley portions 12 are alternately arranged in a width direction X orthogonal to a manufacturing direction Y. The ridge portion 11 is configured with two side surfaces 13 and a top surface 17 between them, and the valley portion 12 is configured with two side surfaces 13 shared with the adjacent ridge portions 11 and a bottom surface 14 between them. Note that, in this embodiment, a case is described in which the shape of the ridge portion 11 is a trapezoid as shown in FIG. 1, but the present invention is not limited to this, and in addition to polygons such as triangles or rectangles, shapes may be curved shapes such as sine curves or bow shapes.

The core material 1 includes the three-dimensional structure continuously in the manufacturing direction Y. That is, as shown in FIG. 1, a plurality of ridge portions 11a, 11b, 11c, and 11d are continuously formed in the manufacturing direction Y. The valley portions 12 are also formed continuously. The connection between the ridge portions 11 and the connection between the valley portions 12 are made by alternately repeating two types of connection methods.

The first connection method is such that, as shown in FIG. 1, on a first folding line X1 in the width direction, top surfaces 17b and 17c of two adjacent ridge portions 11b and 11c are connected, via trapezoidal-shaped ridge portion connecting surfaces 15b and 15c, respectively. A ridge portion connecting surface 15 is formed at a right angle to the top surface 17. On the first folding line X1 in the width direction, bottom surfaces 14b and 14c of two adjacent valley portions are directly connected. The second connection method is such that, as shown in FIG. 1, on a second folding line X2 in the width direction, bottom surfaces 14a and 14b (or 14c and 14d) of two adjacent valley portions are connected, via trapezoidal-shaped valley portion connecting surfaces 16a and 16b (or 16c and 16d), respectively. A valley portion connecting surface 16 is formed at a right angle to the bottom surface 14. On the second folding line X2 in the width direction, top surfaces 12a and 12b (or 12c and 12d) of two adjacent ridge portions are directly connected.

Thus, the core material 1 has a plurality of three-dimensional structures (the ridge portions 11 and the valley portions 12) connected via the connection regions (the ridge portion connecting surfaces 15 and the valley portion connecting surfaces 16), and has the connection region folded to form the core layer of the vehicle interior material of the present invention. Specifically, the core material 1 is mountain-folded along the first folding line X1 such that the bottom surfaces 14b and 14c of two adjacent valley portions contact back-to-back with each other, and the angle formed by the ridge portion connecting surfaces 15b and 15c of two adjacent ridge portions increases to 180 degrees. In addition, the core material 1 is valley-folded along the second folding line X2 such that top surfaces 17a and 17b (or 17c and 17d) of two adjacent ridge portions contact face-to-face with each other, and the angle between the valley portion connecting surfaces 16a and 16b (or 16c and 16d) of two adjacent valley portions decreases to 180 degrees. A core layer 10 of the vehicle interior material of the present invention obtained by folding the core material 1 in this manner is shown in FIGS. 2 and 3.

Figure 2:
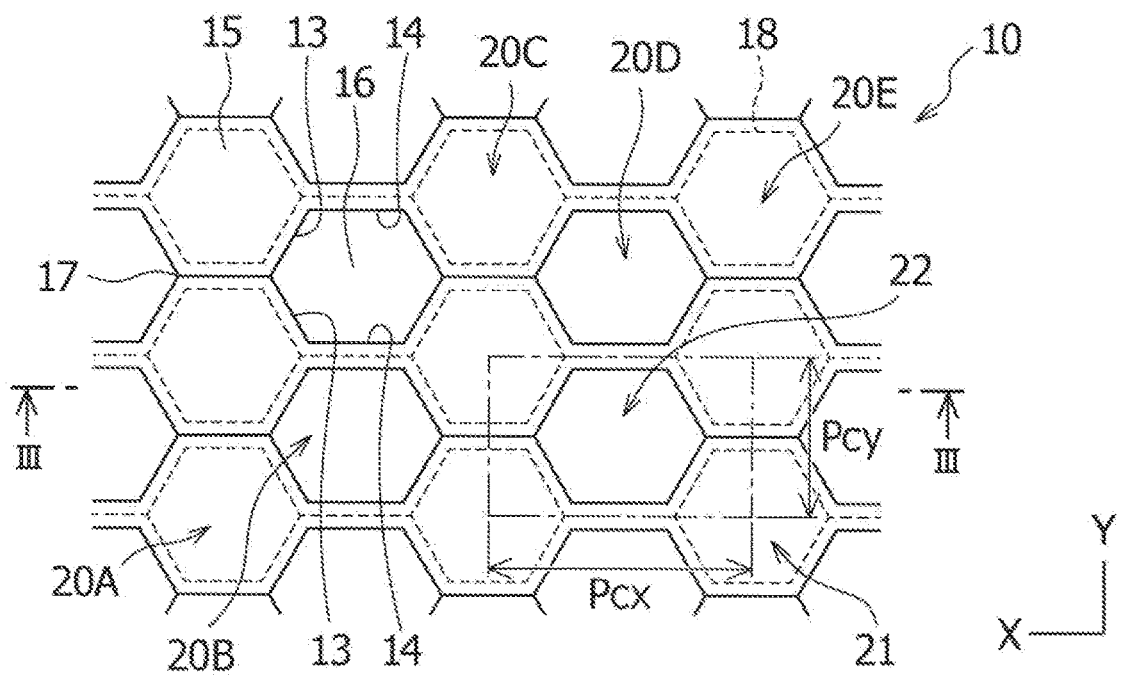
FIG. 2 is a schematic plan view showing a core layer in a vehicle interior material according to the present invention.
Figure 3:
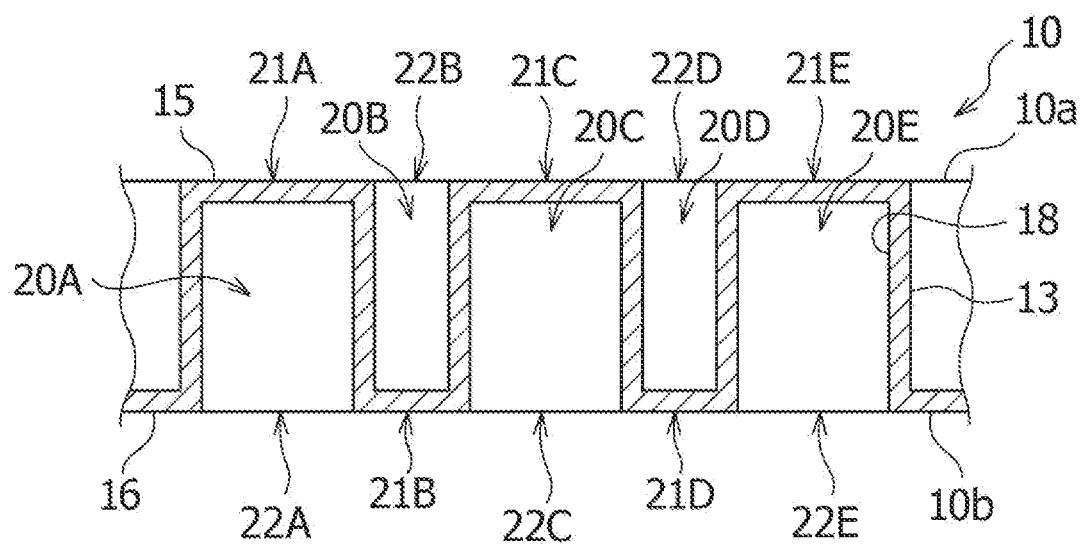
FIG. 3 is a schematic cross-sectional view showing the core layer of FIG. 2 along line III-III.

As shown in FIGS. 2 and 3, the core layer 10 includes substantially hexagonal tubular cells 20 arranged in a plurality of rows, and has cells 20A, 20C and 20E formed out of two adjacent ridge portions and cells 20B and 20D formed out of two adjacent valley portions, each arranged in every other row. A broken line 18 in FIG. 3 is the surface that has been the back surface of the core material, and generally indicates the inner wall of the cell 20 having the substantially hexagonal tubular shape.

The cells 20A, 20C, and 20E formed from the ridge portions each include six cell side walls forming the substantially hexagonal tubular shape. These cell side walls are formed out of the two top surfaces 17 and the four side surfaces 13 of the cell material. Furthermore, these cells 20A, 20C, and 20E include substantially hexagonal tubular-shaped closed surfaces 21A, 21C, and 21E, respectively, to close the cell ends at the cell ends on one surface 10a (front surface in FIG. 2) of the core layer 10. Each of these closed surfaces 21 on one side is formed out of two trapezoidal ridge portion connecting surfaces 15 in the cell material. Furthermore, these cells 20A, 20C, and 20E include open ends 22A, 22C, and 22E that are opened in a substantially hexagonal shape at the cell ends on the other surface 10b which is at the opposite side of the core layer 10. The open ends 22A, 22C, and 22E allow the respective internal spaces of the cells 20A, 20C, and 20E to be in communication with the outside.

The cells 20B and 20D formed from the valley portions each also includes six cell side walls forming the substantially hexagonal tubular shape. These cell side walls are formed from two bottom surfaces 14 and four side surfaces 13 of the cell material. Furthermore, these cells 20B and 20D include open ends 22B and 22D that are opened in the substantially hexagonal shape at the cell ends on the one surface 10a of the core layer 10. The open ends 22B and 22D allow the respective internal spaces of the cells 20B and 20D to be in communication with the outside. Furthermore, these cells 20B and 20D include substantially hexagonal tubular-shaped closed surfaces 21B and 21D that close the cell ends, respectively, at the cell ends on the other surface 10b, which is at the opposite side of the core layer 10. Each of these closed surfaces 21 on the other side is formed out of the two trapezoidal valley portion connecting surfaces 16 in the cell material.

In this way, the core layer 10 has the one-side closed surfaces 21A, 21C, and 21E formed out of the ridge portions of the cell material in every other row at the cell end on one surface 10a, and has the other-side closed surfaces 21B and 21D formed out of valley portions of the cell material in the different cell rows from the above at the cell ends on the other surface 10b. However, unless otherwise stated, both the closed surface 21 on one side and the closed surface 21 on the other side perform substantially the same function.

The thickness of the entire core layer 10 varies depending on which component of the vehicle the vehicle interior material is used for, so it is not limited to the following. However, from the viewpoint of the strength, weight, and sound absorption performance of the core layer 10, the thickness is preferably in the range of 3 mm to 50 mm, and more preferably in the range of 5 mm to 20 mm.

The basis weight (weight per unit area) of the core layer 10 varies depending on which component of the vehicle the vehicle interior material is used for, so it is not limited to the following. However, the basis weight is preferably in the range of 400 g/m$^2$ to 4000 g/m$^2$, and more preferably in the range of 500 g/m$^2$ to 3000 g/m$^2$. As the thickness of the core layer 10 is greater and the basis weight is greater, the strength of the core layer 10 generally tends to be higher.

The basis weight of the core layer 10 can be adjusted by the type of material of the core layer 10, the thickness of the entire core layer 10 or the wall thickness of the cell 20 (thickness of the material sheet) as well as the pitches Pcx and Pcy between the cells 20 of the core layer 10 (distance between the central axes of the cells). In order to set the basis weight of the core layer 10 in the above range, for example, it is preferable that the pitch Pcy between the cells 20 be in the range of 2 mm to 20 mm in the direction in which the cells 20 are adjacent to each other to form a row, which is the core manufacturing direction Y, and it is more preferable that the pitch Pcy be in the range of 3 mm to 15 mm.

Next, individual embodiments of the vehicle interior material according to the present invention are described below using the core layer 10 described above.

First Embodiment

Figure 4:
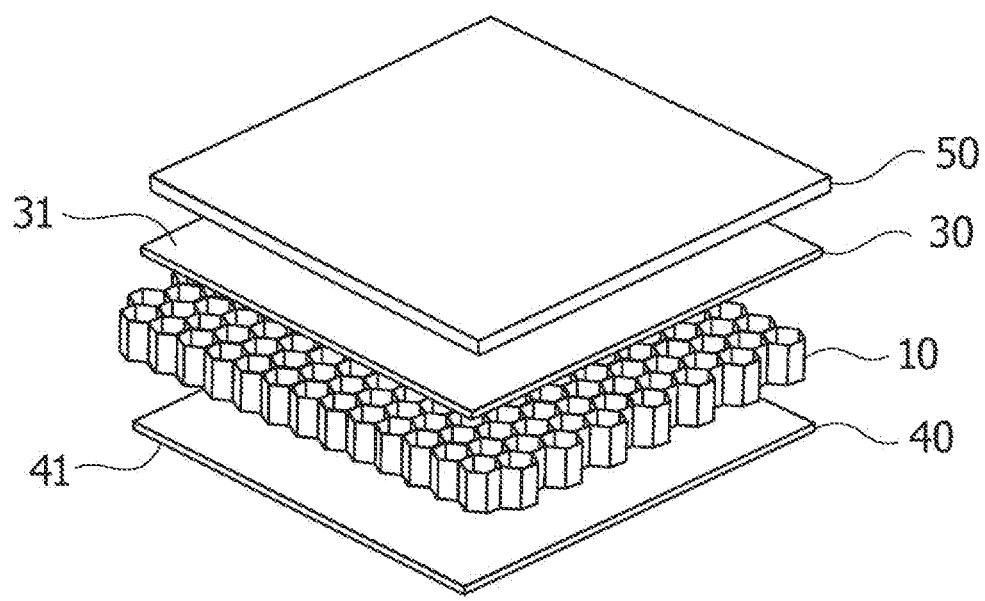
FIG. 4 is an exploded perspective view showing an embodiment of a vehicle interior material according to the present invention.
Figure 5:
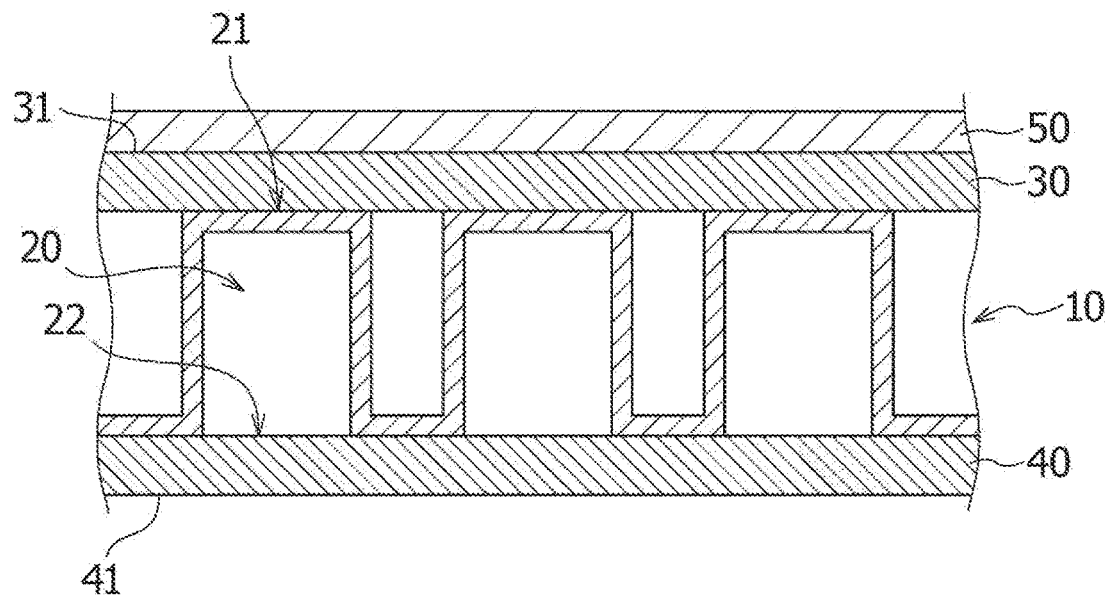
FIG. 5 is a schematic cross-sectional view of an embodiment of the vehicle interior material shown in FIG. 4.

As shown in FIGS. 4 and 5, a vehicle interior material of a first embodiment includes the core layer 10 described above, the design layer 50 provided on one surface of the core layer 10, a first film layer 30 provided between the core layer 10 and the design layer 50, and a second film layer 40 provided on another surface of the core layer 10. Note that the vehicle interior material of the present invention is used so that the design layer 50 side is located on the interior side of the vehicle.

Figure 6A:
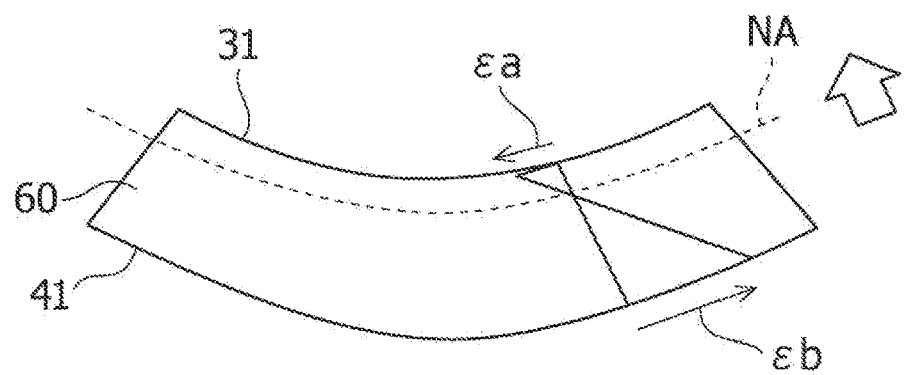
FIG. 6A is a schematic view showing the position of a bending neutral axis when a structure including a core layer and film layers on both sides of the core layer in a vehicle interior material according to the present invention is bent.

Then, as shown in FIG. 6A, in the multilayer structure of the vehicle interior material, a structure 60 including the first film layer 30, the core layer 10, and the second film layer 40 has a strain εa on a surface 31 on the first film layer side, and a strain εb on a surface 41 on the second film layer side. The strain εa is smaller than the strain εb. The vehicle interior material thus has a relationship between the strain εa and the strain εb. As a result, when the vehicle interior material is bent while the vehicle interior material is formed into a predetermined uneven shape, this relationship, as shown in FIG. 6A, causes the bending central axis NA of the structure 60 to move in the direction of the surface 31 on the first film layer side with respect to the thickness center position of the structure 60. This causes the deformation amount of the surface 31 on the first film layer side, which is on the design layer 50 side, to be smaller than the deformation amount of the surface 41 on the second film layer side, which is on the side opposite to the design layer 50. As a result, when the vehicle interior material is bent and the design layer 50 is contracted, the deformation amount of the contraction can decrease. This decrease can reduce generation of wrinkles, which conventionally are generated because the design layer 50 cannot sufficiently contract.

To make the strain εa on the surface 31 on the first film layer side of the structure 60 smaller than the strain εb on the surface 41 on the second film layer side thereof, for example, the first film layer 30 can be differentiated from the second film layer 40 in the tensile-compressive rigidity. There are the following methods for making the difference in tensile-compressive rigidity. For example, the same resin film material is used for the first and second film layers 30 and 40, but the first film layer 30 may have inorganic particles such as talc dispersed therein, so that the tensile-compressive rigidity of the first film layer 30 can be increased. Alternatively, the same elastomer film material is used for the first and second film layers 30 and 40, but the second film layer 40 may have rubber particles such as ethylene propylene diene rubber (EPDM) dispersed therein, so that the tensile-compressive rigidity of the second film layer 40 can be lowered. Still alternatively, the first film layer 30 may have a metal foil such as aluminum foil laminated thereon, so that the tensile-compressive rigidity of the first film layer 30 on which the metal foil is laminated can be increased.

In addition, the core layer 10 is not limited to the core layer having the specific structure shown in FIGS. 1 to 3 described above, and it may be a core layer in which general tubular cells are arranged in a plurality of rows. As such a core layer 10 is thicker, the rigidity of vehicle interior material can be higher. However, the thicker the core layer 10, the more the surface of the design layer 50 of the vehicle interior material contracts. This is prone to generate wrinkles on the surface of the design layer 50 due to bending during molding of the vehicle interior material or the like. Then, as shown in FIG. 6B, the structure 60 is further configured to satisfy the expression $0<\varepsilon a \times h/(\varepsilon a+\varepsilon b)<5$, where: εa is the strain on the surface 31 on the first film layer side; εb is the strain on the surface 41 on the second film layer side; h is the thickness of the structure 60, to enable reducing generation of wrinkles on the design layer 50 even when the core layer 10 is thick (particularly, $h \geq 5$ mm).

Figure 6B:
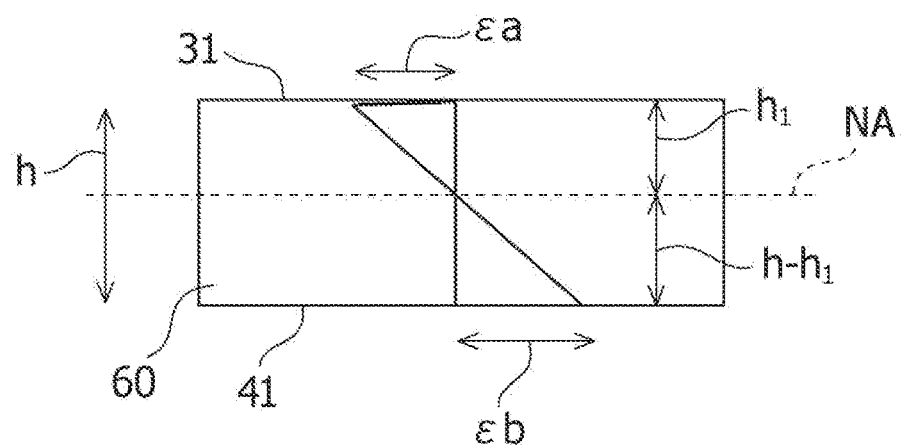
FIG. 6B is a schematic diagram showing dimensions of this structure and the neutral axis.

As shown in FIG. 6B, the relationship of $\varepsilon a:\varepsilon b=h_1:(h-h_1)$ holds for h and $h_1$, where: h is the thickness of the structure 60; and $h_1$ is the distance from the surface 31 on the first film layer side to the bending central axis NA of the structure 60. This relationship can be transformed into $h_1=\varepsilon a \times h/(\varepsilon a+\varepsilon b)$. That is, the expression of εa, εb, and h indicates the range from the lower limit to the upper limit of the distance $h_1$ from the surface 31 on the first film layer side of the structure 60 to the bending central axis NA. The thickness h of the structure is the sum of the thickness of the core layer 10 described above and the thicknesses of the first and second film layers 30 and 40 to be described below in detail. For example, the lower limit of the thickness h is preferably 3 mm or more, more preferably 4 mm or more, and still more preferably 5 mm or more. In addition, the upper limit of the thickness h is preferably 20 mm or less, more preferably 15 mm or less, and still more preferably 10 mm or less.

The materials used for the first and second film layers 30 and 40 may be, for example, resin films such as polypropylene (PP), polyethylene (PE), polyethylene terephthalate (PET), and polyamide (PA) films, and elastomer films such as olefin and urethane films, but it is not limited to these. The first film layer 30 and the second film layer 40 may have the same material used therefor, or different materials used therefor, to satisfy the relationship between the strain εa and the strain εb, or the relationship among the strain εa, the strain εb, and the thickness h of the structure.

In addition, the first and second film layers 30 and 40 of the resin film may have inorganic particles such as talc, calcium carbonate, and silica, dispersed therein, to enable increasing the tensile-compressive rigidity of the first and second film layers 30 and 40, and to satisfy the relationship between the strain εa and the strain εb, or the relationship among the strain εa, the strain εb, and the thickness h of the structure. The size of the inorganic particles is not particularly limited, but for example, those having an average particle diameter of 0.05 to 2 μm are preferable, and those having an average particle diameter of 0.1 to 1 μm are more preferable. Note that the "average particle diameter" indicates a cumulative particle diameter of 50% from the fine particle side in the volume-based particle size distribution measured by the laser diffraction-scattering method.

Furthermore, the first and second film layers 30 and 40 made of the elastomer film may have rubber-based particles such as EPDM and ethylene propylene rubber (EPR), dispersed therein, to enable decreasing the tensile-compressive rigidity of the first and second film layers 30 and 40, and to satisfy the relationship between the strain εa and the strain εb, or the relationship among the strain εa, the strain εb, and the thickness h of the structure. The size of the rubber-based particles is not particularly limited, but for example, those having an average particle diameter of 1 to 100 μm are preferable, and those having an average particle diameter of 20 to 70 μm are more preferable.

The thicknesses of the first and second film layers 30 and 40 are not particularly limited, but for example, the lower limit thereof is preferably 0.03 mm or more, more preferably 0.04 mm or more, still more preferably 0.05 mm or more. In addition, the upper limit of the thickness is preferably 0.5 mm or less, more preferably 0.4 mm or less, and still more preferably 0.3 mm or less. The first film layer 30 and the second film layer 40 may have the same thickness or may have different thicknesses, to satisfy the relationship between the strain εa and the strain εb, or the relationship among the strain εa, the strain εb, and the thickness h of the structure.

The first film layer 30 and the design layer 50 may have a metal foil (not shown) such as an aluminum foil, a stainless steel foil, or a copper foil, laminated therebetween, or the first film layer 30 and the core layer 10 may do the same therebetween, to enable increasing the tensile-compressive rigidity of the first film layer 30 on which the metal foil is laminated, and to satisfy the relationship between the strain εa and the strain εb, or the relationship among the strain εa, the strain εb, and the thickness h of the structure. The thickness of the metal foil is preferably thin in order to reduce the weight of the vehicle interior material. For example, the upper limit thereof is preferably 0.2 mm or less, and more preferably 0.1 mm or less. In addition, the lower limit of the thickness is not particularly limited, but it is preferably 0.005 mm or more, and more preferably 0.01 mm or more.

The first and second film layers 30 and 40 may be adhered to the core layer 10 by heat-welding, or may be adhered thereto via an adhesive (not shown). The adhesive to be used is not particularly limited, but for example, it may be an epoxy-based or acrylic-based adhesive. In addition, the first and second film layers 30 and 40 each may have a three-layer structure including a central layer and two adhesive layers located on both side surfaces thereof. In this case, the material of the adhesive layer is a material having a melting point lower than the melting point of the material used for the central layer. For example, polyamide having a melting point of 190° C. to 220° C. is used for the central layer, and polyethylene having a melting point of 90° C. to 130° C. is used for the adhesive layer. Then, the temperature at the time of heating when the first and second film layers 30 and 40 are adhered to the core layer 10, and the temperature for thermoforming into a predetermined shape of the vehicle interior material are set to about 150° C. to 160° C. This configuration and process can melt only the adhesive layer without melting the central layer to enable the central layer to firmly adhere to the core layer 10. A resin having a melting point higher than that of polyethylene for the adhesive layer may be a polypropylene as well as a polyamide.

The design layer 50 may be one of those used as design layers for general vehicle interior materials, and it is not particularly limited. However, the design layer 50 may be, for example, a layer configured with fiber such as nonwoven fabric, plain needle punched fabric, or velour, a layer configured with foamed resin such as urethane foam, polyethylene foam, nylon foam, or a layer in which these are combined. The nonwoven fabric is not limited to the following, but it is preferable to use various nonwoven fabrics such as spunbonded, spunlaced, or needle punched nonwoven fabrics using a resin such as polyethylene terephthalate (PET), polypropylene (PP), or polyethylene (PE). The basis weight of the design layer 50 varies depending on which component of the vehicle the vehicle interior material is to be used for, and it is not limited to the following, but for example, the lower limit thereof is preferably 10 $g/m^2$ or more, more preferably 20 $g/m^2$ or more, and still more preferably 30 $g/m^2$ or more. In addition, the upper limit of the basis weight is, for example, preferably 500 $g/m^2$ or less, more preferably 300 $g/m^2$ or less, and still more preferably 250 $g/m^2$ or less.

Second Embodiment

Figure 7:
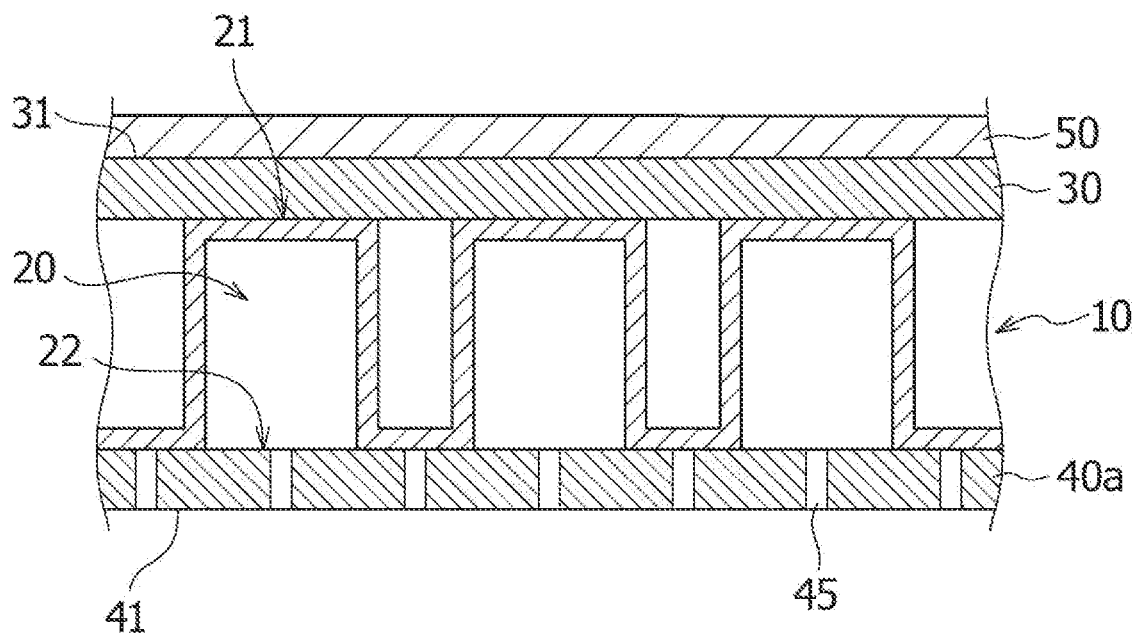
FIG. 7 is a schematic cross-sectional view showing another embodiment of a vehicle interior material according to the present invention.

As shown in FIG. 7, a vehicle interior material of a second embodiment includes the core layer 10 mentioned above and a design layer 50 provided on one side surface of the core layer 10, a first film layer 30 provided between the core layer 10 and the design layer 50, and a second film layer 40a, having a plurality of apertures, provided on another surface of the core layer 10. Note that the same configurations as those in the first embodiment are referred to by the same reference signs, and detailed descriptions thereof are omitted here.

The apertures in the second film layer 40a penetrate the layer, so that the second film layer 40a is breathable. A plurality of such apertures are provided in the second film layer 40a, so that the tensile-compressive rigidity of the second film layer 40a can be lowered. In the same manner as in the first embodiment, as shown in FIG. 6A, this can cause the structure 60, which has the first film 30, the core layer 10 and the second film 40a, to have a strain εa on the surface 31 on the first film layer side smaller than a strain εb on the surface 41 on the second film layer side. In addition, this can cause the strain εa of the surface 31 on the first film layer side of the structure 60, the strain εb of the surface 41 on the second film layer side, and the thickness h of the structure 60 to have a relationship to satisfy the expression $0<\varepsilon a \times h/(\varepsilon a+\varepsilon b)<5$.

The holes are provided in advance before the second film layer 40a is adhered to the core layer 10, for example, by a hot needle or punching (punching using a male die and a female die). In order to prevent the holes from being closed, it is preferable to have a hole shape in which burrs of the holes are minimized. The aperture pattern does not have any particular limitation, but it is preferably arranged in a staggered arrangement or a lattice arrangement. The aperture rate of the second film layer 40a is not particularly limited, but it is preferably in the range of 0.2% to 5%. The diameter of the aperture is preferably in the range of 0.25 mm to 2.5 mm, and more preferably in the range of 0.3 mm to 2.0 mm. Note that the pitch of the apertures of the second film layer 40a does not necessarily need to be the same as the pitches Pcx and Pcy of the cells 20 of the core layer 10 shown in FIG. 2, and the apertures and the cells 20 do not necessarily need to be aligned when the second film layer 40a is adhered to the core layer 10. This is because the positions of the apertures of the second film layer 40a, and the open ends 22 of the cells 20 of the core layer 10 randomly overlap each other to allow appropriate communication between the inside and outside. It is preferable that the pitch of the apertures of the second film layer 40a be smaller than the pitch of the cells 20 of the core layer 10 at least in either an X direction or a Y direction.

According to the second embodiment, a plurality of apertures are provided in the second film layer 40a, so that the tensile-compressive rigidity of the second film layer 40a can be lowered. This makes it possible to obtain the same effect as that of the first embodiment, and to obtain the effect that the plurality of apertures in the second film layer 40a can impart sound absorption or insulation performance to the vehicle interior material.

Note that, in FIG. 7, a plurality of apertures are provided only in the second film layer 40a, but the present invention is not limited to this. A plurality of apertures may be provided in both the first and second film layers 30 and 40, or a plurality of apertures may be provided only in the first film layer 30. Means other than providing apertures (change of film material, addition of inorganic or rubber particles, lamination of metal foil, or the like) also may be used, to satisfy the relationship between the strain εa and the strain εb, or the relationship among the strain εa, the strain εb, and the thickness h of the structure.

In addition, in the first and second embodiments described above, cases are described in each of which the core layer 10 having a structure in which tubular cells are arranged in a plurality of rows is used as the core layer of the vehicle interior material, but the present invention is not limited to this. If the core layer 10 has a hard structure having hollow portions inside, the core layer 10 can prevent wrinkles from being generated on the design surface even if the core layer 10 is heat-molded into a predetermined uneven shape, while maintaining a low weight and high rigidity. Any hard core layer may be used if it has a Young's modulus of 100 kPa or more in the compression direction (that is, the direction between the two surfaces on which the first and second film layers 30 and 40 are adhered). So, the material of the core layer to be used may be, for example, a fiber material or a urethane material, as well as the material of the core material described above.

EXAMPLES

Examples of the present invention are described below.

As Test Example 1, a vehicle interior material including the core layer, the first and second film layers, and the design layer shown in FIG. 7 was produced. First, to produce a structure, the first film layer (material: polypropylene (PP) film, thickness: 70 μm) was adhered to one surface of the core layer having the structures shown in FIGS. 2 and 3

Figure 8:
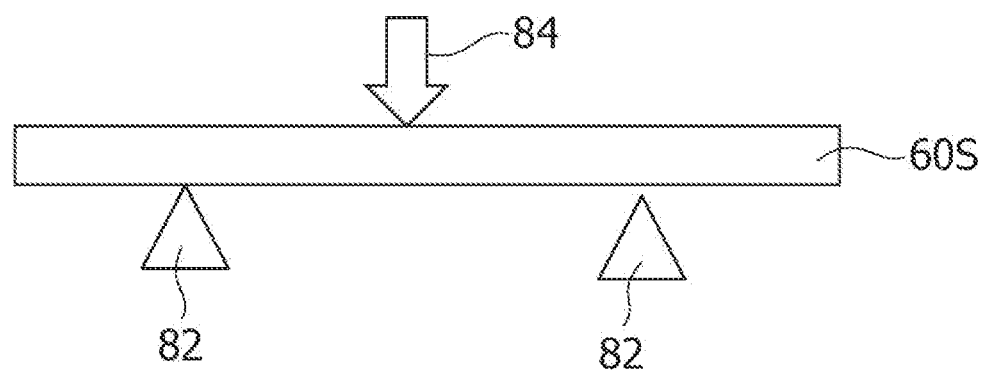
FIG. 8 is a schematic view illustrating a method for measuring strain on a vehicle interior material according to the present invention.

(material: polypropylene (PP) resin, pitch between cells Pcy: 4 mm, core layer thickness: 6 mm), and the second film layer having a plurality of apertures (material: three-layer structured polypropylene (PP) film, thickness: 65 μm, aperture pitch: 7 mm) was adhered to the other surface of the core layer. Then, this structure was subjected to three-point bending using a universal material testing machine (model 5900, manufactured by Instron), and the strain was measured. The size of the test piece of the structure was 60 mm×200 mm. As shown in FIG. 8, a test piece 60S of the structure was supported by two fulcrums 82 located at an interval of 100 mm, and a load was applied to the center position thereof with an indenter 84 such that the indenter 84 moved down by 0.5 mm. For strain measurement, a strain measuring instrument (PCD-400A, manufactured by Kyowa Electronic Instruments Co., Ltd.) was used. Each of the strains εa and εb on both sides of the structure was measured. As a result, the strain εa on the surface on the first film layer side was 396μ, and the strain εb on the surface on the second film layer side was 408μ.

Next, a design layer (material: plain needle punched fabric, thickness: 1 mm) was adhered to the first film layer side of this structure to produce a vehicle interior material. Then, this vehicle interior material was heat-molded into a U-shape, and the surface of the design layer of the vehicle interior material after the heat-molding was visually observed. As a result, no wrinkle was observed on the surface of the design layer of the vehicle interior material.

In addition, as shown in Table 1, Test Examples 2 to 5 were produced in the same manner as in Test Example 1 except that each of the film layers and the core layers had different thickness and a film layer had a metal foil provided thereon. Subsequently, the strains were measured and the surfaces of the design layers after heat-molding were observed. The results are shown in Table 1.

Note that Test Example 6 was produced for comparison in the same manner as in Test Example 1 except that the second film layer had exactly the same structure as the first film layer. For Test Example 6, the strains were measured and the surface of the design layer after heat-molding was observed in the same manner as in Test Example 1. The results are shown in Table 1.

TABLE 1

| | Material & basis weight of design layer | Material & thickness of first film | Core layer Pitch | Core layer Thickness | Material & thickness of second film | εa | εb | εa × h/ (εa + εb) | Design layer wrinkle observation result |
|---|---|---|---|---|---|---|---|---|---|
| Test Example 1 | Plain needle punched fabric 200 g/m² | PP film 70 μm | 4 mm | 6 mm | Apertured PP film (3 layers) 65 μm | 396μ | 408μ | 2.96 | None |
| Test Example 2 | Plain needle punched fabric 200 g/m² | PP film 300 μm | 4 mm | 6 mm | PP film 50 μm | 256μ | 365μ | 2.47 | None |
| Test Example 3 | Plain needle punched fabric 200 g/m² | PP film 300 μm + AL foil 30 μm | 8 mm | 10.5 mm | PP film 50 μm | 47μ | 347μ | 1.25 | None |
| Test Example 4 | Plain needle punched fabric 200 g/m² | PP film 300 μm | 8 mm | 10.5 mm | PP film 50 μm | 281μ | 402μ | 4.32 | None |
| Test Example 5 | Plain needle punched fabric 200 g/m² | PP film 150 μm | 8 mm | 10.5 mm | PP film 50 μm | 352μ | 399μ | 4.92 | None |
| Test Example 6 | Plain needle punched fabric 200 g/m² | PP film 70 μm | 8 mm | 10.5 mm | PP film 70 μm | 375μ | 375μ | 5.25 | Wrinkles generated |
| Test Example 7 | Plain needle punched fabric 200 g/m² | PP film 300 μm | 10 mm | 20 mm | PP film 50 μm | 276μ | 395μ | 8.23 | Many wrinkles generated |

As shown in Table 1, in the structures each having the first film layer, the core layer, and the second film layer, of the configurations of the vehicle interior materials, Test Examples 1 to 5 had the strain εa on the surface on the first film layer side, which is on the design layer side, smaller than the strain εb on the surface on the second film layer side, which is on the side opposite to the design layer. Test Examples 1 to 5 had no wrinkle observed on the surface of the design layer even after heat-molding. On the other hand, Test Example 6 having the same strain εa and the strain εb had wrinkles observed on the surface of the design layer. In addition, Test Example 7 had a relationship among the strain εa, the strain εb, and the thickness h of the structure such that εa×h/(εa+εb) was as high as about 8, and Test Example 7 had more wrinkle generation observed.

INDUSTRIAL APPLICABILITY

The vehicle interior material of the present invention can reduce wrinkle generation on the surface of the design layer after heat-molding while maintaining high rigidity. Therefore, the vehicle interior material of the present invention is specifically useful for components that are required to have high rigidity and aesthetics, such as floor carpets, trunk trims, trunk floors, head linings, and seat back covers.

REFERENCE SYMBOL LIST

1 Core material
10 Core layer
11 Ridge portion
12 Valley portion
13 Side surface portion
14 Bottom surface portion
15 Ridge portion connecting surface
16 Valley portion connecting surface
17 Top surface
18 Back surface of core material
19 Through hole
20 Cell
21 Closed surface
22 Open end
30 First film layer
40 Second film layer
50 Design layer

The invention claimed is:
1. A vehicle interior material having a multilayer structure, the material consisting of:
a hard core layer having a hollow portion inside;
a design layer provided on one surface side of the core layer, the design layer located on an interior side of a vehicle;
a first film layer provided between the core layer and the design layer, the first film layer being a first non-apertured film comprising a resin film material or elastomer film material and having a first tensile-compressive rigidity; and
a second film layer provided on a surface of the core layer on a side opposite to the first film layer, the second film layer being a second non-apertured film comprising a resin film material or elastomer film material and having a second tensile-compressive rigidity that is lower than the first tensile-compressive rigidity,
wherein a strain εa is smaller than a strain εb, the strain εa being a strain on a surface of a structure on a side of the first film layer, the structure consisting of the first film layer, the core layer, and the second film layer, and the strain εb being a strain on a surface of the structure on a side of the second film layer,
wherein a thickness h of the structure is less than 20 mm, and
wherein a relationship among the strain εa, the strain εb, and the thickness h of the structure satisfies the expression $0 < \varepsilon a \times h/(\varepsilon a + \varepsilon b) < 5$.

2. The vehicle interior material according to claim 1, wherein the core layer has a structure in which tubular cells are arranged in a plurality of rows.

3. The vehicle interior material according to claim 2, wherein each of the tubular cells in the core layer has a closed surface at one end and an open end at another end,
the open end allows an internal space of a cell of the tubular cells to be in communication with an outside, and
the open ends of the tubular cells are arranged on both sides of the core layer such that rows of the open ends of the tubular cells are in every other row.

4. The vehicle interior material according to claim 1, wherein the core layer has a thickness of at least 10.5 mm.

5. The vehicle interior material according to claim 1, wherein the first and second film layers are made of the same resin film material, and the first film layer has inorganic particles disposed therein.

6. The vehicle interior material according to claim 1, wherein the first and second film layers are made of the same elastomer film material, and the second film layer has rubber particles dispersed therein.

7. The vehicle interior material according to claim 1, wherein the first film layer consists of the resin film material and a metal foil laminated thereon.

* * * * *